(12) United States Patent
Anderson et al.

(10) Patent No.: US 9,796,055 B2
(45) Date of Patent: Oct. 24, 2017

(54) TURBINE CASE RETENTION HOOK WITH INSERT

(71) Applicant: UNITED TECHNOLOGIES CORPORATION, Hartford, CT (US)

(72) Inventors: Derek W. Anderson, Cromwell, CT (US); Oleg Ivanov, Suffield, CT (US); Michael J. Madel, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 546 days.

(21) Appl. No.: 14/179,589

(22) Filed: Feb. 13, 2014

(65) Prior Publication Data
US 2014/0234098 A1     Aug. 21, 2014

Related U.S. Application Data

(60) Provisional application No. 61/765,741, filed on Feb. 17, 2013.

(51) Int. Cl.
| | | |
|---|---|---|
| *F01D 5/00* | (2006.01) | |
| *B23P 6/00* | (2006.01) | |
| *F01D 25/24* | (2006.01) | |

(52) U.S. Cl.
CPC ............... *B23P 6/007* (2013.01); *B23P 6/002* (2013.01); *F01D 5/005* (2013.01); *F01D 25/246* (2013.01); *F05D 2230/80* (2013.01); *Y10T 29/49732* (2015.01)

(58) Field of Classification Search
CPC ... F01D 9/02; F01D 9/04; F01D 9/042; F01D 5/005; F01D 25/246; F01D 25/28; F01D 25/285; F05D 2240/11; F05D 2240/14
USPC ........... 415/209.2, 209.3; 416/215, 216, 218, 416/219 R
See application file for complete search history.

(56) References Cited

U.S. PATENT DOCUMENTS

| | | | | | |
|---|---|---|---|---|---|
| 3,628,880 | A | * | 12/1971 | Smuland | ................. F01D 5/189 415/115 |
| 4,353,679 | A | * | 10/1982 | Hauser | ................... F01D 5/189 165/47 |
| 4,721,433 | A | * | 1/1988 | Piendel | .................. F01D 25/14 415/115 |
| 5,149,250 | A | * | 9/1992 | Plemmons | ............. F01D 9/042 415/209.2 |
| 5,333,995 | A | * | 8/1994 | Jacobs | ................. F01D 25/246 415/173.1 |
| 5,846,050 | A | * | 12/1998 | Schilling | ................... F01D 9/04 415/135 |
| 6,296,443 | B1 | * | 10/2001 | Newman | ................. F01D 9/042 415/189 |
| 6,892,931 | B2 | * | 5/2005 | Steplewski | ............. B23P 6/005 228/119 |
| 7,246,995 | B2 | * | 7/2007 | Zborovsky | ............. F01D 9/023 415/137 |
| 7,278,821 | B1 | * | 10/2007 | O'Reilly | ................. F01D 9/042 29/889.21 |
| 7,980,813 | B2 | | 7/2011 | Medynski et al. | |
| 8,153,922 | B2 | | 4/2012 | Belanger | |

(Continued)

*Primary Examiner* — Richard Edgar
*Assistant Examiner* — Su Htay
(74) *Attorney, Agent, or Firm* — Carlson, Gaskey & Olds, PC

(57) ABSTRACT

A method of repairing a turbine engine case includes the steps of removing worn material from a retention hook in a casing, and inserting an insert into a recess within the hook.

7 Claims, 5 Drawing Sheets

(56) References Cited

U.S. PATENT DOCUMENTS

| | | | |
|---|---|---|---|
| 8,272,129 B2 | 9/2012 | Kersteman | |
| 8,299,389 B2 | 10/2012 | Belanger | |
| 9,334,756 B2* | 5/2016 | Ring | F01D 9/042 |
| 2010/0068050 A1* | 3/2010 | Hansen | F01D 25/246 |
| | | | 415/209.3 |
| 2012/0076659 A1* | 3/2012 | Robertson | B01D 46/02 |
| | | | 416/219 R |
| 2012/0128481 A1* | 5/2012 | Baumas | F01D 9/042 |
| | | | 415/209.2 |
| 2013/0209249 A1* | 8/2013 | Langlois | F01D 9/04 |
| | | | 415/209.3 |
| 2014/0093363 A1* | 4/2014 | Ring | F01D 9/042 |
| | | | 415/189 |
| 2014/0241874 A1* | 8/2014 | Rioux | F01D 25/246 |
| | | | 415/209.4 |
| 2015/0118040 A1* | 4/2015 | Lee | F01D 9/042 |
| | | | 415/209.3 |
| 2015/0132123 A1* | 5/2015 | Stricker | F01D 9/02 |
| | | | 415/209.2 |

* cited by examiner

US 9,796,055 B2

TURBINE CASE RETENTION HOOK WITH INSERT

CROSS-REFERENCE TO RELATED APPLICATION

This application claims priority to U.S. Provisional Application No. 61/765,741, filed Feb. 17, 2013.

BACKGROUND OF THE INVENTION

This application relates to a method and apparatus wherein a retention hook in a case for a gas turbine engine is provided with a reinforcing insert.

Gas turbine engines are known and typically include a compressor delivering air into a combustor. The air is mixed with fuel and ignited and products of the combustion pass downstream across turbine blades, driving them to rotate.

The turbine and compressor rotors are typically provided by a plurality of rotating blades that rotate with rotors. There are typically several rows or stages of the rotor blades. Rows of static vanes are positioned intermediate the rotor blade rows.

One way of mounting the static vanes into cases, which surround both the turbine and compressor sections, is through a retention hook. In a retention hook, an ear is provided at one end of the vane and sits within the hook in the case.

With operation of the engine, there is wear between the ear and the hook. This can reduce the predictability of positioning of the vane and, thus, is undesirable. It is known to repair the hook and, typically, welding or plasma spray have been utilized. This is, however, unduly expensive.

SUMMARY OF THE INVENTION

In a featured embodiment, a method of repairing a turbine engine case includes the steps of removing worn material from a retention hook in a casing, and inserting an insert into a recess within the hook.

In another embodiment according to the previous embodiment, the hook is defined by a radially inner ledge, a radially outer ledge and a connecting web, with the recess defined there between.

In another embodiment according to any of the previous embodiments, material is removed from the radially inner ledge, the radially outer ledge, and also the web to reach an enlarged recess prior to the insert being inserted.

In another embodiment according to any of the previous embodiments, the insert has a radially outer ledge, a radially inner ledge and a web.

In another embodiment according to any of the previous embodiments, an ear of a static vane is inserted into the recess after the insert is inserted into the recess.

In another embodiment according to any of the previous embodiments, the insert is formed of a metal.

In another embodiment according to any of the previous embodiments, the insert is circumferentially continuous.

In another embodiment according to any of the previous embodiments, the insert is formed of circumferentially segmented sections.

In another embodiment according to any of the previous embodiments, the casing is a turbine case.

In another featured embodiment, a case for a gas turbine engine has a retention hook extending radially inward from an inner surface of the casing. The retention hook is defined by radially inner and outer ledges. A web connects the radially inner and outer ledges and an insert is received within a recess defined between the radially inner and outer ledges and the web. The recess receives an ear from a static vane.

In another embodiment according to the previous embodiment, the insert has a radially inner ledge, a radially outer ledge, and connecting web.

In another embodiment according to any of the previous embodiments, the insert is formed of metal.

In another embodiment according to any of the previous embodiments, the insert is circumferentially continuous about a central axis of the casing.

In another embodiment according to any of the previous embodiments, the insert is formed of circumferentially segmented sections.

In another featured embodiment, a gas turbine engine has a casing with a retention hook extending radially inward from an inner surface of the casing. The retention hook is defined by radially inner and outer ledges. A web connects the radially inner and outer ledges. An insert is received within a recess defined between the radially inner and outer ledges and the web. The recess receives an ear from a static vane.

In another embodiment according to the previous embodiment, the insert has a radially inner ledge, a radially outer ledge, and connecting web.

In another embodiment according to any of the previous embodiments, the insert is formed of metal.

In another embodiment according to any of the previous embodiments, the insert is circumferentially continuous about a central axis of the casing.

In another embodiment according to any of the previous embodiments, the insert is formed of circumferentially segmented sections.

These and other features may be best understood from the following drawings and specification.

DETAILED DESCRIPTION

Figure 1:
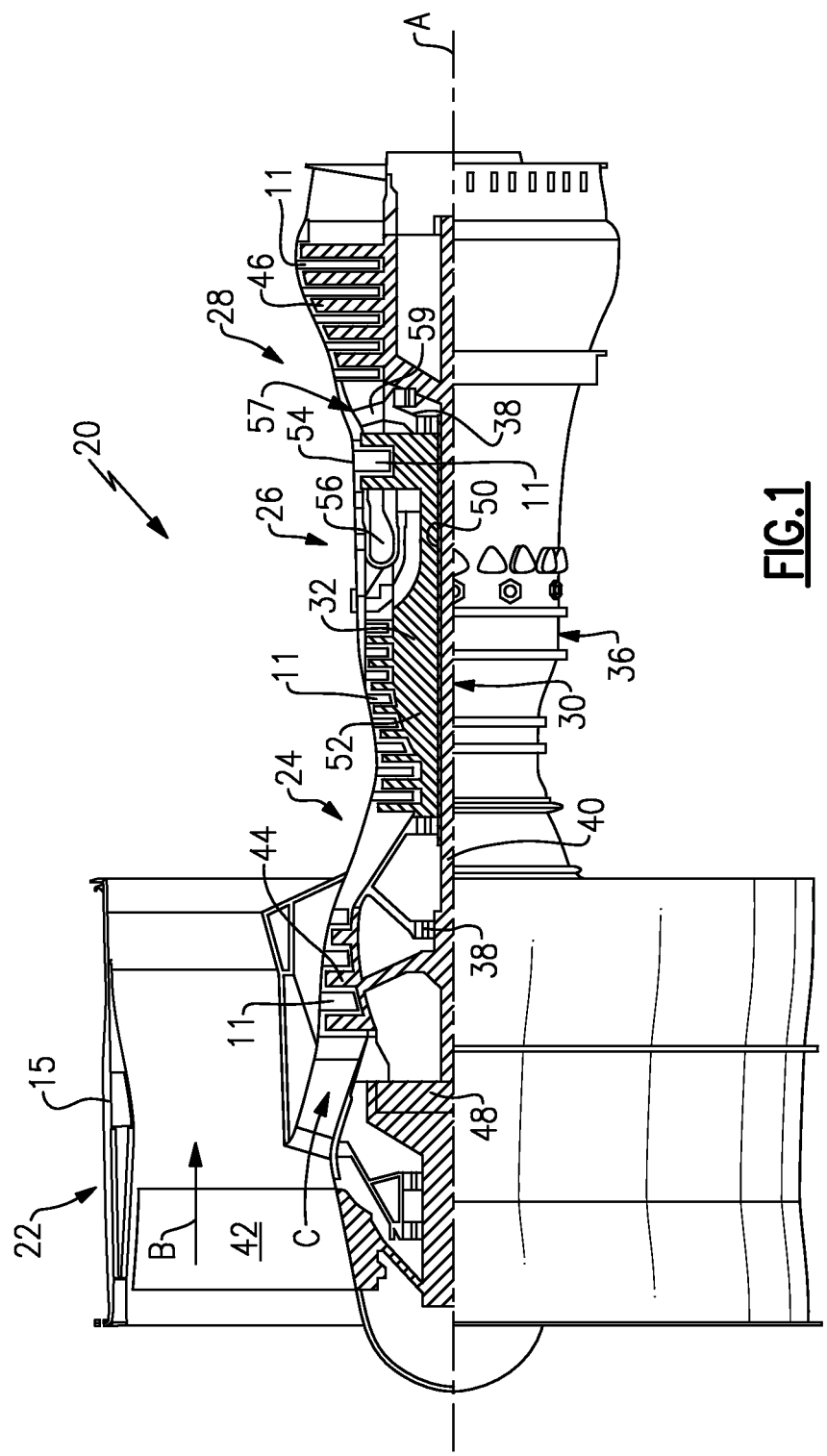
FIG. 1 shows a gas turbine engine schematically.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6:1), with an example embodiment being greater than ten (10:1), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
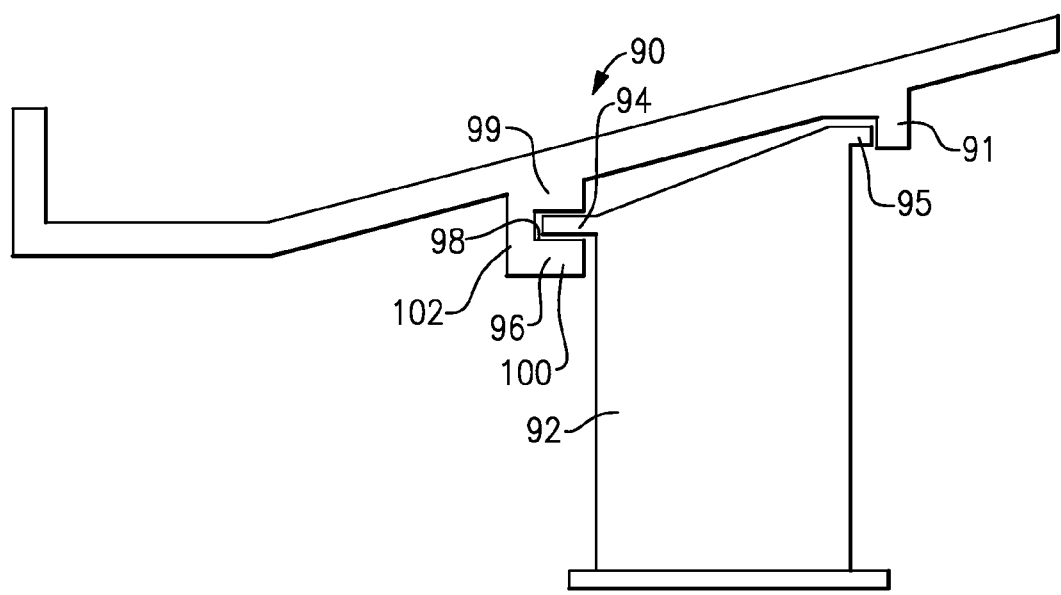
FIG. 2 shows a case within the gas turbine engine.
Figure 3A:
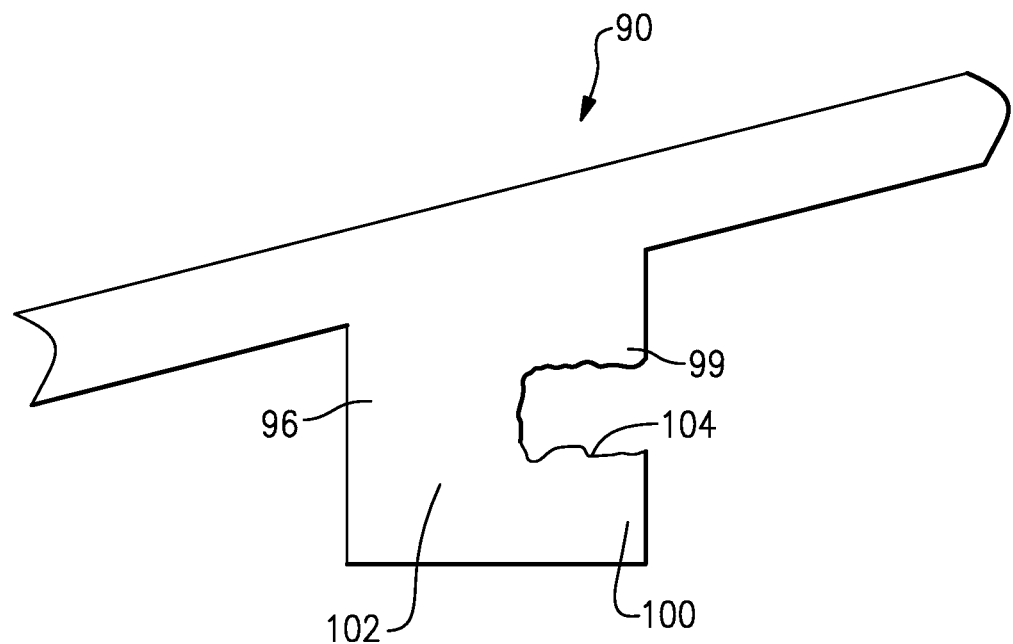
FIG. 3A shows a first step in a repair method.

FIG. 2 shows a case 90, which may be a case surrounding the low pressure turbine section 46 of FIG. 1. However, the teachings of this application would extend to the high pressure turbine section and either compressor section. The case 90 mounts a vane 92, which may be similar to the vanes 11 as shown schematically in FIG. 1. A forward ear 94 of the vane 92 sits within a retention hook 96. As shown, the retention hook 96 has a radially inner ledge 100, a web 102 and a radially outer ledge 99. Between inner surfaces of elements 99, 102 and 100, there is a groove 98 which receives the ear 94. It should be understood that the hook 96 may be circumferentially intermediate or may surround the full 360 degrees about the axis A of the gas turbine engine. A rear ear 95 of the vane 92 is not secured to the casing 90, but rather sits inwardly of a ledge 91. Forces on the vane 92 during operation, such as gas pressure forces, hold the vane in the position illustrated in FIG. 2. Since the vane is not secured at the rear end 95, there is relative movement between the groove 98 and the ear 94, and there may be wear within the groove 98. The surface may be eroded away as shown at 104 in FIG. 3A. With this wear, the predictability of positioning of the vane 92 can become more difficult and, thus, repair is suggested.

Figure 3B:
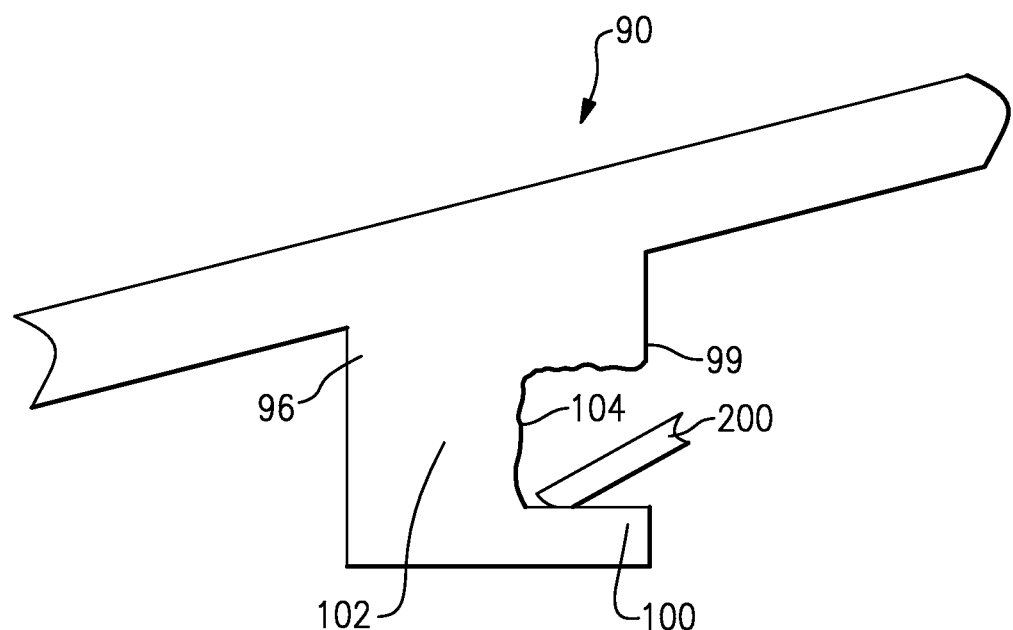
FIG. 3B shows a subsequent step.
Figure 3C:
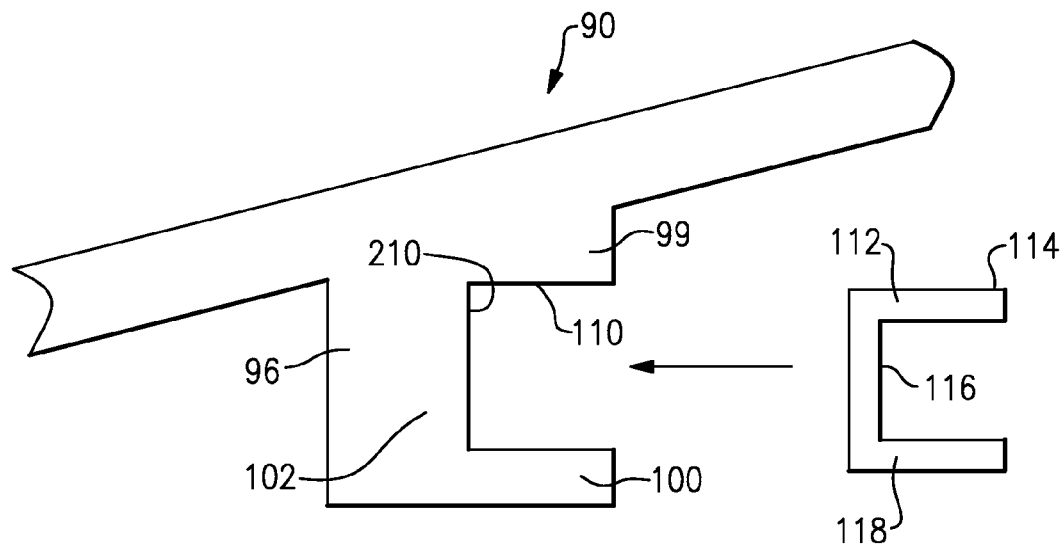
FIG. 3C shows a subsequent step.

FIG. 3B shows a machine 200 machining away a surface of the one area 104. This machining continues until the entire worn surface has been removed, such as shown in FIG. 3C. Once the new recess 210 is formed from a machine and with the removal of the worn area, an insert 112 may be inserted into the recess 210. The insert 112 may be secured via welding, press fit or other process. Of course, recess 210 is enlarged compared to recess 98. The insert 112 may be formed of an appropriate metal or other material which is similar to the parent material, and which provides wear characteristics equivalent or better than the material of the casing 90. As shown, the insert 112 has a radially outer ledge 114, a radially inner ledge 118, and a connecting web 116. The insert may surround the circumference of the hook 96 or there may be multiple segmented inserts.

Figure 3D:
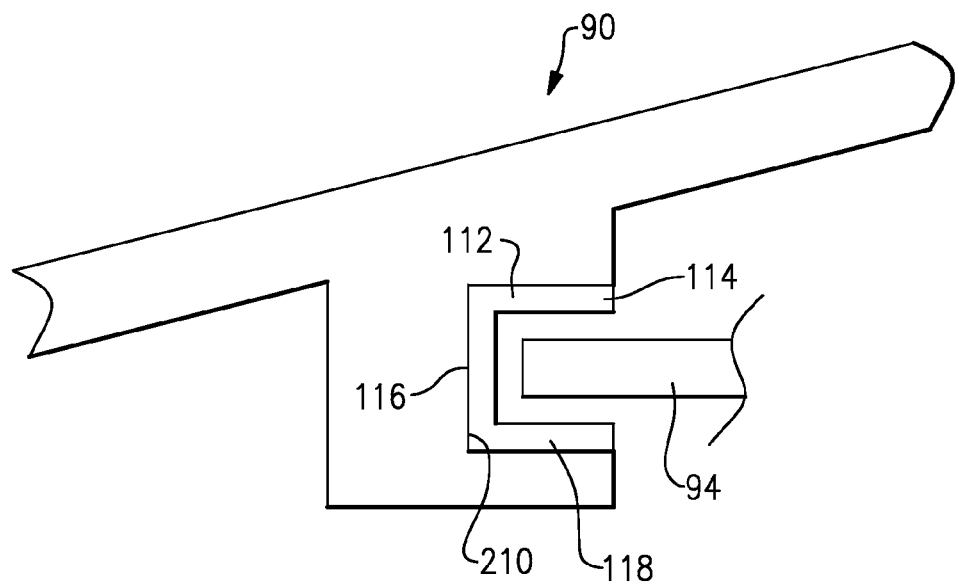
FIG. 3D shows a final step.

As shown in FIG. 3D, insert 112 has now been inserted into the enlarged recess 210 and the ear 94 returned.

Figure 4A:
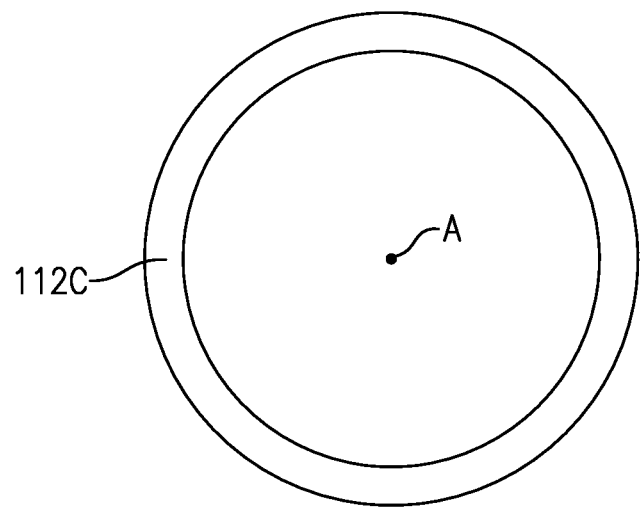
FIG. 4A shows the first embodiment.
Figure 4B:
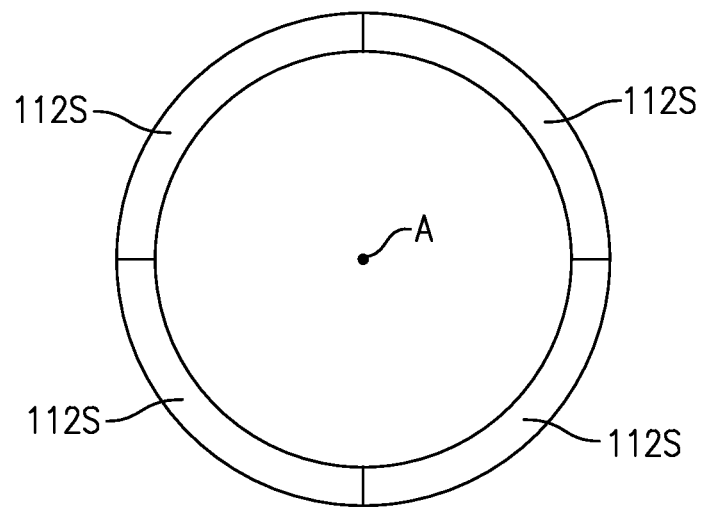
FIG. 4B shows the second embodiment.

As shown in FIG. 4A, the insert 112C may be continuous about a center axis A. As shown in FIG. 4B, the insert can be formed of a plurality of circumferentially segmented sections 112S, and all centered about a center axis A.

The inventive method is relatively inexpensive and requires less rework than the prior art and also avoids structural durability reduction due to the repair process.

While the invention is disclosed as a repair process, a case having a retention hook with an insert as originally manufactured is also inventive within this application.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of repairing a turbine engine case comprising the steps of:
    removing worn material from a retention hook in a casing, and inserting an insert into a recess within the hook;

wherein said hook is defined by a radially inner ledge, a radially outer ledge and a connecting web, with said recess defined there between;

wherein material is removed from the radially inner ledge, the radially outer ledge, and also the web to reach an enlarged recess prior to the insert being inserted; and wherein said insert having a radially outer ledge, a radially inner ledge and a web.

2. The method as set forth in claim 1, wherein an ear of a static vane is inserted into said recess after said insert is inserted into said recess.

3. The method as set forth in claim 1, wherein said insert is formed of a metal.

4. The method as set forth in claim 1, wherein said insert is circumferentially continuous.

5. The method as set forth in claim 1, wherein said insert is formed of circumferentially segmented sections.

6. The method as set forth in claim 1, wherein said casing is a turbine case.

7. The method as set forth in claim 1, wherein there is a ledge spaced from said retention hook and on said casing.

\* \* \* \* \*